United States Patent
Huber et al.

(10) Patent No.: US 10,231,127 B2
(45) Date of Patent: **\*Mar. 12, 2019**

(54) METHODS AND DEVICES FOR PERFORMING A MOBILE NETWORK SWITCH

(71) Applicant: GIESECKE & DEVRIENT GMBH, München (DE)

(72) Inventors: Ulrich Huber, München (DE); Thomas Larsson, Älvsjö (SE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 364 days.

This patent is subject to a terminal disclaimer.

(21) Appl. No.: 14/911,087

(22) PCT Filed: Aug. 8, 2014

(86) PCT No.: PCT/EP2014/002190
§ 371 (c)(1),
(2) Date: Feb. 9, 2016

(87) PCT Pub. No.: WO2015/018532
PCT Pub. Date: Feb. 12, 2015

(65) Prior Publication Data
US 2016/0183095 A1  Jun. 23, 2016

(30) Foreign Application Priority Data
Aug. 9, 2013  (EP) .................................... 13003980

(51) Int. Cl.
*H04W 8/18* (2009.01)
*H04W 12/08* (2009.01)
(Continued)

(52) U.S. Cl.
CPC .......... *H04W 12/08* (2013.01); *H04L 63/102* (2013.01); *H04L 67/303* (2013.01); *H04W 8/265* (2013.01); *H04W 12/06* (2013.01); *H04W 12/04* (2013.01)

(58) Field of Classification Search
CPC ......... H04W 60/00; H04W 8/02; H04W 8/06; H04W 8/186; H04W 8/04; H04W 12/04;
(Continued)

(56) References Cited

U.S. PATENT DOCUMENTS

2007/0254711 A1  11/2007  Young et al.
2010/0136967 A1   6/2010  Du et al.

OTHER PUBLICATIONS

CSMG, "Reprogrammable SIMs: Technology, Evolution and Implications," URL: http://stakeholders.ofcom.org.uk/binaries/research/telecoms-research/reprogrammable-sims.pdf, Sep. 25, 2012, pp. 1-95.
(Continued)

*Primary Examiner* — Lester G Kincaid
*Assistant Examiner* — Dung L Lam
(74) *Attorney, Agent, or Firm* — Workman Nydegger

(57) ABSTRACT

A method of performing a switch from a first mobile network to a second mobile network by a mobile terminal comprising a secure element comprises the steps of: (a) requesting attachment to the first mobile network using a first identification data element, preferably a first IMSI, of a first subscription profile; (b) requesting attachment to the second mobile network using a second identification data element, preferably a second IMSI, of a second subscription profile; and (c) requesting attachment to the first mobile network. The second mobile network or another mobile network uses a confirmation data element, wherein the confirmation data element has the same format as the first and the second identification data element and is configured such that the attachment request is forwarded to a subscription management server in order to inform the subscription
(Continued)

management server whether the attachment to the second mobile network was successful.

10 Claims, 2 Drawing Sheets

(51) Int. Cl.
*H04W 8/26* (2009.01)
*H04W 12/06* (2009.01)
*H04L 29/06* (2006.01)
*H04L 29/08* (2006.01)
*H04W 12/04* (2009.01)

(58) Field of Classification Search
CPC ....... H04W 12/06; H04W 12/08; H04W 8/26; H04L 61/6054; H04L 67/303; H04L 63/102
See application file for complete search history.

(56) References Cited

OTHER PUBLICATIONS

Extended European Search Report for corresponding European Application No. 13003980.3, Jan. 31, 2014.
International Search Report for corresponding International PCT Application No. PCT/EP2014/002190, Jan. 20, 2015.

METHODS AND DEVICES FOR PERFORMING A MOBILE NETWORK SWITCH

FIELD OF THE INVENTION

The invention relates to mobile communications in general and in particular to methods and devices for performing a switch from a first subscription profile for attaching to a first mobile network to a second subscription profile for attaching to a second mobile network by a mobile terminal comprising a secure element, such as a subscriber identity module (SIM), an eUICC/UICC or the like.

BACKGROUND OF THE INVENTION

Communicating by means of a mobile terminal, such as a mobile phone, via a public land mobile network (PLMN; also referred to as a mobile or cellular communications network herein) operated by a mobile network operator (MNO) generally requires the mobile terminal to be equipped with a secure element for securely storing data uniquely identifying the user of the mobile terminal (also called subscriber). For instance, in the context of a mobile terminal configured to communicate according to the Global System for Mobile Communications (GSM), currently the world's most popular standard for mobile communications systems, the secure element is called a subscriber identity module (SIM) and is usually provided in the form of a smart card. According to the GSM standard, the technical features of which are defined by a large number of interrelated and mutually dependent specifications published by the ETSI standardization organization, the SIM contains subscription credentials for authenticating and identifying the user of the mobile terminal, including in particular an International Mobile Subscriber Identity (IMSI) and an authentication key $K_i$. These subscription credentials are generally stored on the SIM as part of a subscription profile by the SIM manufacturer/vendor or the MNO during a SIM personalization process prior to providing the user of the mobile terminal with his SIM. A non-personalized SIM is generally not suited for use in a mobile terminal, i.e. using the services provided by a PLMN with a non-personalized SIM without a subscription profile is not possible.

One particular field of application of secure elements, such as SIMs, eUICCs, UICCs and the like, which is expected to grow rapidly in the future is M2M (machine-to-machine) communication, i.e. the communication between machines over a cellular communications network without human intervention, also called the Internet of things. In M2M communication data is automatically transmitted between many different types of machines equipped with a secure element in the form of a M2M module, such as TV systems, set top boxes, vending machines, vehicles, traffic lights, surveillance cameras, sensor devices, and the like. It is foreseeable that at least for some of these devices it will not be possible or at least very difficult to provide the secure element beforehand with a subscription profile, including for instance an IMSI. This is because in a lot of M2M devices the secure element will most likely be implemented in the form of a surface mounted chip or chip module without the possibility of providing the secure element with a subscription profile beforehand. Consequently, once in the field, these M2M devices and their non-personalized secure elements generally require the provision of a subscription profile over-the-air.

When using the services provided by a MNO, in particular communicating via the PLMN provided by the MNO, the user of a mobile terminal is usually charged a certain monthly fee by the MNO. If the mobile user wants, for instance due to a lower monthly charge and/or superior services, to change to a different MNO, he generally has to manually replace the SIM provided by the current MNO and containing the subscription profile necessary for attaching to the PLMN of the current MNO by the SIM provided by the new MNO and containing the subscription profile necessary for attaching to the PLMN of the new MNO. Certainly, it would be easier for the user, if instead of this conventional process of switching to a new MNO by manually replacing the SIM it would be possible to use one and the same secure element in the form of a SIM that can be "reprogrammed" over-the-air.

Conventional methods are known for downloading a target subscription profile over-the-air onto a secure element with an already existing subscription profile and performing a switch from the already existing subscription profile to the target subscription profile associated with a target mobile network. Moreover, it is known to confirm the successful switch to the target mobile network by using a SMS or USSD message or by means of a BIP (bearer independent protocol). However, these communication means for confirming a mobile network switch are not always available, for instance, because SMS cannot be used on the target mobile network due to no credit yet. Nevertheless, also in these cases it is important to know whether the switch to a target mobile network has been successful, especially in the field of M2M devices, i.e. devices not directly overseen by a user. There is, therefore, a need for improved methods and devices for performing a switch from a first mobile network to a second mobile network by a mobile terminal comprising a secure element, such as a subscriber identity module (SIM), an eUICC/UICC or the like.

SUMMARY OF THE INVENTION

The above object is achieved according to the present invention by the subject-matter of the independent claims. Preferred embodiments of the invention are defined in the dependent claims.

According to a first aspect the invention provides for a method of performing a switch from a first mobile network (herein also referred to as provisioning mobile network) to a second mobile network (herein also referred to as target mobile network) by a mobile terminal comprising a secure element. The method comprises the steps of: (a) requesting attachment to the first mobile network using a first identification data element, preferably a first IMSI, of a first subscription profile; (b) requesting attachment to the second mobile network using a second identification data element, preferably a second IMSI, of a second subscription profile; and (c) requesting attachment to the first mobile network, the second mobile network or another mobile network using a confirmation data element, preferably a confirmation IMSI, wherein the confirmation IMSI has the same data format as the first or the second identification data element and is configured such that the attachment request is forwarded to a subscription management server in order to inform the subscription management server whether the attachment to the second mobile network was successful.

Preferably the method comprises the following additional step after step (c):

(d) requesting attachment to the second mobile network using the second identification data element of the second subscription profile.

According to preferred embodiments of the invention, the second subscription profile including the second identification data element is downloaded by the secure element from the subscription management server, while the secure element is attached to the first mobile network. Preferably, the confirmation data element is downloaded by the secure element from the subscription management server along with the second subscription profile.

According to preferred embodiments of the invention, the method includes the additional step of informing the first mobile network, the second mobile network or a different mobile network about the confirmation data element in order for the respective mobile network to be able to forward the attachment request to the subscription management server.

Preferably in addition to encoding an address of the subscription management server the confirmation data element contains information about the state of the secure element and/or a unique identifier that allows the subscription management server to identify the secure element.

Preferably step (c) of the method includes the additional step of receiving commands from the subscription management server to be executed by the secure element. Preferably, the commands are encoded in the standard reply to the attachment request.

According to preferred embodiments of the invention, the first mobile network and/or the second mobile network are operated according to the GSM standard. Preferably, the attachment request issued by the secure element is a "Send Authentication Information" message.

Preferably the first subscription profile is a provisional subscription profile that is stored on the secure element during the manufacturing and/or personalization process of the mobile terminal and/or the secure element.

According to a second aspect the invention provides for a secure element configured to perform the steps of the method according to the first aspect of the invention.

Preferably, the secure element is a subscriber identity module (SIM) for authentication/identification of a subscriber in the mobile network. Such a SIM communicates with the mobile terminal via a card reader therein and can be removed in principle from the mobile terminal to be either replaced by a different SIM and/or used in a different mobile terminal. Alternatively, the secure element is an integral part of the mobile terminal such as a hard-wired chip module. Such embedded secure elements are known, for instance, as embedded Universal Integrated Circuit Cards (eUICCs). Preferably, the secure element supports storage of multiple subscription profiles which may be associated with different MNOs. Generally, only one subscription profile is active at a time.

According to a third aspect the invention provides for a mobile terminal containing a secure element according to the second aspect of the invention.

The mobile terminal according to the present invention comprises means for communicating with a cellular communications network, in order to receive a new subscription profile. Preferably, the mobile terminal is implemented in form of a smart phone, a tablet PC, a notebook, a PDA, or the like. Alternatively the mobile terminal can be a multimedia device such as digital picture frame, audio equipment, a TV system, a set top box, an e-book reader and so on. By way of example, the term "mobile terminal" also includes any kind of machinery, like vending machines, vehicles, smart-meters and the like that are configured to communicate via a cellular communications system in the context of a M2M system.

According to a fourth aspect the invention provides for a subscription management server configured to interact with the secure element according to the second aspect of the invention according to the method according to the first aspect of the invention.

These and other features, characteristics, advantages, and objects of the invention will be clear from the following detailed description of preferred embodiments, given as a non-restrictive example, under reference to the attached drawings. The person skilled in the art will appreciate, in particular, that the above preferred embodiments can be combined in several ways, which will result in additional advantageous embodiments that are explicitly supported and covered by the present invention. In particular, the person skilled in the art will appreciate that the above described preferred embodiments can be implemented in the context of the above mentioned different aspects of the invention.

DETAILED DESCRIPTION OF PREFERRED EMBODIMENTS

Figure 1:
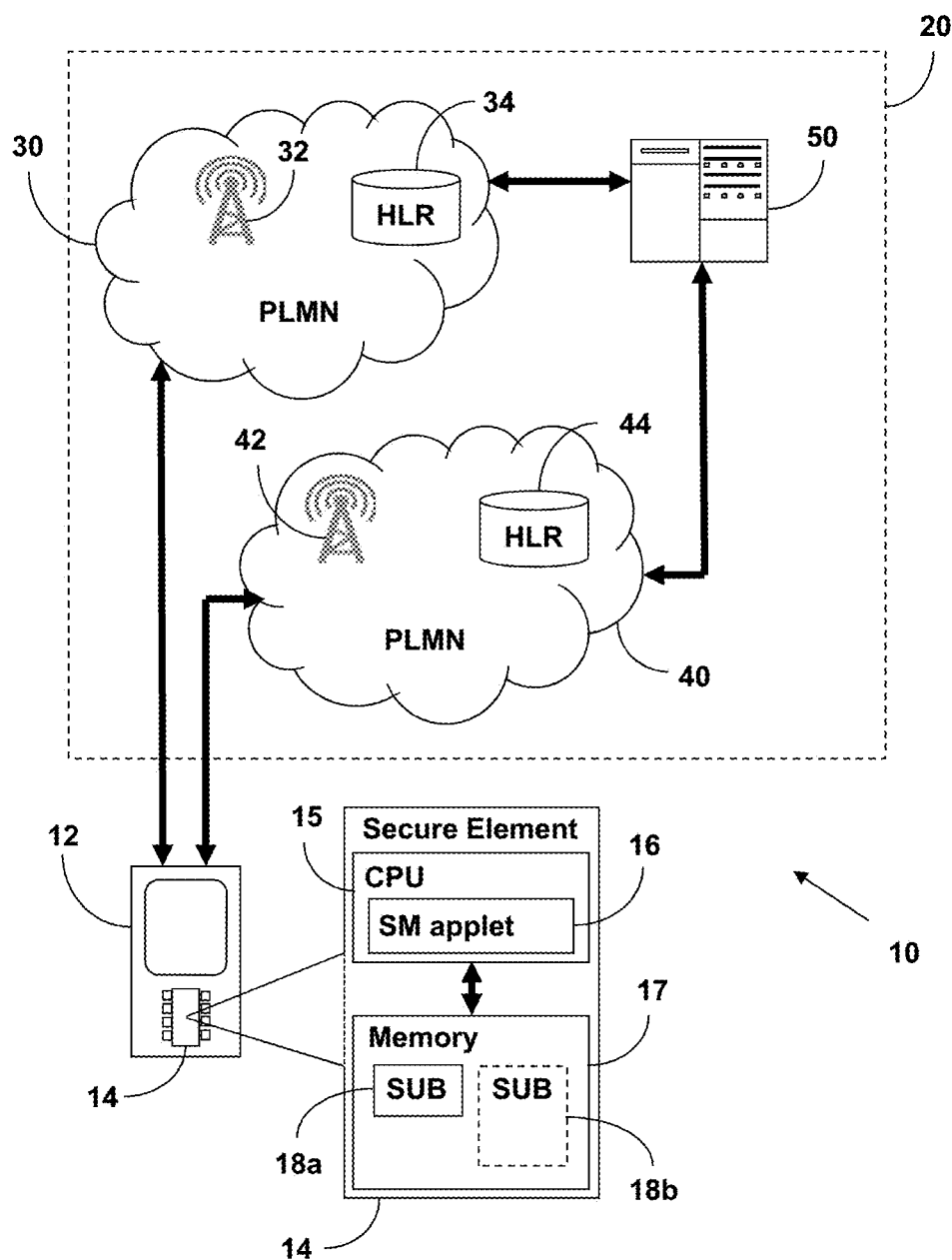
FIG. 1 shows a schematic overview of a mobile communications system illustrating different aspects of the present invention.

FIG. 1 shows schematically the components of a communications system 10 as well as some of the communication channels or links between the components of this system 10 that illustrate different aspects of the present invention. Although the below detailed description will refer to a "mobile" terminal, the person skilled in the art will appreciate that the present invention can be advantageously implemented in the context of any kind of terminal that is configured to communicate via a mobile or cellular communications network. In other words, the attribute "mobile" used herein refers to the ability of a terminal to communicate via a mobile or cellular communications network (or short mobile network), also including IP based mobile communication networks.

An exemplary mobile terminal 12 is shown in FIG. 1 including a secure element 14 for securely storing and processing data that uniquely identifies the mobile terminal 12 and/or its user, i.e. the subscriber. As indicated in FIG. 1, the mobile terminal 12 preferably is a mobile phone, smart phone or a similar device. The person skilled in the art will appreciate, however, that the mobile terminal 12 according to the present invention can be implemented in the form of other devices as well, such as a tablet or notebook computer, a TV system, a set top box, a vending machine, a vehicle, a surveillance camera, a sensor device and the like.

According to preferred embodiments of the invention the secure element 14 is configured as an eUICC or UICC with a SIM application running thereon, i.e. a secure element that can be mounted in the mobile terminal 12 and used in cellular communications systems for unique and secure subscriber identification as well as for the provision of different special functions and value-added services. Alternatively, the secure element 14 could be configured as a removable subscriber identity module (SIM), the SIM currently being the most popular type of secure element. The person skilled in the art will appreciate, however, that other types of secure elements that, depending on the underlying generation and type of cellular communications system standard, are designated as USIM, R-UIM, ISIM and the like, are also encompassed by the present invention. Moreover, the secure element 14 could be a M2M module or a Trusted Execution Environment (TEE) implemented as part of the mobile terminal 12.

The mobile terminal 12 is configured to communicate via the air interface (or radio link) with a first cellular communications network or public land mobile network (PLMN) 30 or a second cellular communications network or public land mobile network (PLMN) 40 of a mobile communications system 20. Preferably, the first PLMN 30 (also referred to herein as the provisioning PLMN 30) is operated by a first mobile network operator (MNO) and the second PLMN 40 (also referred to herein as the target PLMN 30) is operated by a second mobile network operator (MNO). Preferably, the provisioning PLMN 30 and the target PLMN 40 can be accessed from substantially the same physical location. According to preferred embodiments the provisioning PLMN 30 and/or the target PLMN 40 are operated according to the GSM standard.

In the following, preferred embodiments of the invention will be described in the context of mobile or cellular communications networks according to the standards of the Global System for Mobile communication (GSM), as specified in a number of specifications provided by ETSI. However, the person skilled in the art will appreciate that the present invention may be advantageously applied in connection with other cellular communications systems as well. Such systems include third-generation cellular communications systems (3GPP), such as the Universal Mobile Telecommunications System (UMTS), and next generation or fourth-generation mobile networks (4G), such as Long Term Evolution (LTE), as well as other cellular communications systems.

As is well known to the person skilled in the art, a PLMN configured according to the GSM standard generally comprises a base station subsystem consisting of one or more base transceiver stations that define respective cells of the PLMN and are connected to a base station controller. Generally, the base station controller is one of several base station controllers that communicate with a common mobile switching center (MSC). Often, a local database called Visitor Location Register (VLR) for keeping track of the mobile users currently located within the cells covered by a MSC (i.e. the MSC service area) is incorporated in the MSC. The MSC provides essentially the same functionality as a central office switch in a public-switched telephone network and is additionally responsible for call processing, mobility management, and radio resource management. The MSC is further in communication with a home location register (HLR), which is the primary database of the PLMN that stores information about its mobile users required for authentication. To this end, the HLR generally is in communication with an authentication center (AUC). The person skilled in the art will appreciate that although the above described components of a conventional GSM system may have different names in different or consecutive standards for mobile communications networks, the underlying principles used therein are substantially similar and, therefore, compatible with the present invention.

As is known to the person skilled in the art, the communication means between the above described components of a PLMN may be proprietary or may use open standards. The protocols may be SS7 or IP-based. SS7 is a global standard for telecommunications defined by the International Telecommunication Union (ITU) Telecommunication Standardization Sector (ITU-T). The standard defines the procedures and the protocols by which network elements in the public switched telephone network (PSTN) exchange information over a digital signaling network to effect wireless (cellular) and wired call set-up, routing and control. The SS7 network and protocol are used for e.g. basic call setup, management, wireless services, wireless roaming, and mobile subscriber authentication, i.e. enhanced call features providing for efficient and secure worldwide telecommunications. How the network elements are grouped or left separate and the interfaces—whether proprietary or open—between these elements are left to the MNO.

Of the above described components of a PLMN only the following ones are shown in the schematic drawing of FIG. 1 for ease of explanation: an exemplary base transceiver station 32 and a HLR 34 for the provisioning PLMN 30 and an exemplary base transceiver station 42 and a HLR 44 for the target PLMN 40. The provisioning PLMN 30 and the target PLMN 40 are each at least in temporary communication with a subscription management server 50, as will be described in more detail further below. The provisioning PLMN 30 and/or the target PLMN 40 moreover could each comprise a SMS-C (Short Message Service Center) for storing, forwarding, converting and delivering SMS messages or be connected to a common SMS-C.

As can be taken from the enlarged view of the secure element 14 in FIG. 1, the secure element 14 preferably comprises a central processing unit (CPU) 15. Preferably, the CPU 15 is configured such that at least one subscription management application 16 (SM applet) can be executed on the CPU 15 providing for some of the features that will be described in the context of FIG. 2 in more detail further below. The subscription management application 16 could be implemented, for instance, as a Java Applet. For providing an execution environment for the subscription management application 16 a secure element operating system (not shown in FIG. 1) is preferably implemented on the CPU 15.

Moreover, the secure element 14 preferably comprises a memory unit 17, which preferably is implemented as a non-volatile, rewritable memory unity, e.g., a flash memory. As can be taken from FIG. 1, a first subscription profile (SUB) 18a is stored in the memory unit 17 of the secure element 14. This first subscription profile 18a comprises data that allow the secure element 14 and the mobile terminal 12 to attach to the provisioning PLMN 30, i.e. data, such as subscription credentials, a MNO specific authentication algorithm, and the like. Preferably, at least parts of the memory unit 17 of the secure element 14 are configured to securely store the data therein, for instance any subscription credentials to be kept secret, such as an International Mobile Subscriber Identity (IMSI) and/or an authentication key $K_i$, that are part of the first subscription profile 18a. As indicated in FIG. 1, the memory unit 17 preferably provides several "slots" for accommodating additional subscription profiles, such as a second subscription profile (SUB) 18b, which is preferably provided by the subscription management server 50 according to the process shown in FIG. 2 and described in more detail further below.

Preferably, the first subscription profile 18a is stored in the memory unit 17 of the secure element 14 during the manufacturing and/or personalization process of the mobile terminal 12 and/or its secure element 14. Especially in the context of this preferred embodiment it is conceivable that the first subscription profile 18a is merely a provisional subscription profile only providing for basic services that allow the secure element 14 and mobile terminal 12 to communicate with the subscription management server 50 via the provisioning PLMN 30 and to download a more complete subscription profile providing for additional services, such as the second subscription profile 18b shown in FIG. 1. As a provisional subscription profile, such as the first subscription profile 18a shown in FIG. 1, generally provides only a limited functionality, the user of the mobile terminal 12 generally will be enticed to change to a more complete subscription profile providing for additional services, such as the second subscription profile 18b shown in FIG. 1.

As is known to the person skilled in the art, one of the essential steps involved in a conventional GSM attachment procedure is that the secure element 14 provides an identification data element in form of an IMSI (that is part of a subscription profile) to the mobile communications network it wants to attach to. More specifically, the secure element 14 issues a "Send Authentication Information" message using the MAP (Mobile Application Part) protocol. In the conventional GSM attachment procedure this message is routed by the receiving mobile switching center on the basis of the IMSI to the relevant home location register (HLR) for requesting authentication triplets.

When the HLR receives the IMSI and the request for authentication triplets, it first checks its database to make sure the number is valid and belongs to the network. Once it has accomplished this, it forwards the IMSI and the request for authentication triplets to the AUC. The AUC uses the IMSI to look up the authentication key Ki associated with that IMSI. The AUC will also generate a 128-bit random number called RAND, which together with the authentication key Ki is fed into the A3 encryption algorithm. The output of the A3 encryption algorithm is a 32-bit number called Signed Response (SRES). The RAND number and the authentication key Ki are moreover fed into the A8 encryption algorithm. The output is a 64-bit number called Kc. The Kc is the ciphering key that is used in the A5 encryption algorithm to encipher and decipher the data that is being transmitted over the air interface to the mobile terminal 12. The RAND number, the SRES, and the ciphering key Kc form an authentication triplet that is unique to the IMSI used for creating this triplet. Once the AUC has generated such an authentication triplet, it forwards it to the HLR, which, in turn, sends it to the requesting MSC. The MSC stores the ciphering key Kc and the SRES but forwards the RAND number as the challenge of the GSM authentication procedure to the mobile terminal 12 and further to the secure element 14 and requests authentication.

According to the present invention the above described conventional procedure is modified in such a way as to provide for a confirmation that the switch from the provisioning PLMN 30 to the target PLMN 40 has been successful. More specifically, the fact that the "Send Authentication Information" message is routed to the relevant HLR on the basis of the IMSI provided therewith is used for routing the "Send Authentication Information" message to the subscription management server 50 by using an appropriately configured IMSI (herein referred to as the confirmation IMSI) instead of the "conventional" IMSI. In other words, the confirmation IMSI according to the present invention defines the address of the subscription management server 50 the "Send Authentication Information" message is to be routed to.

The operation of the subscription management server 50 in combination with the other elements of the communications system 10 shown in FIG. 1 will now be described in the context of a preferred embodiment of the invention under further reference to FIG. 2 for the case where in the beginning only the provisional subscription profile 18a is present on the secure element 14. From the following detailed description the person skilled in the art will appreciate, however, that the present invention can be also advantageously used in the case where in addition to the provisional subscription profile 18a also the target subscription profile 18b (and possibly other subscription profiles) is already present on the secure element 14.

Figure 2:
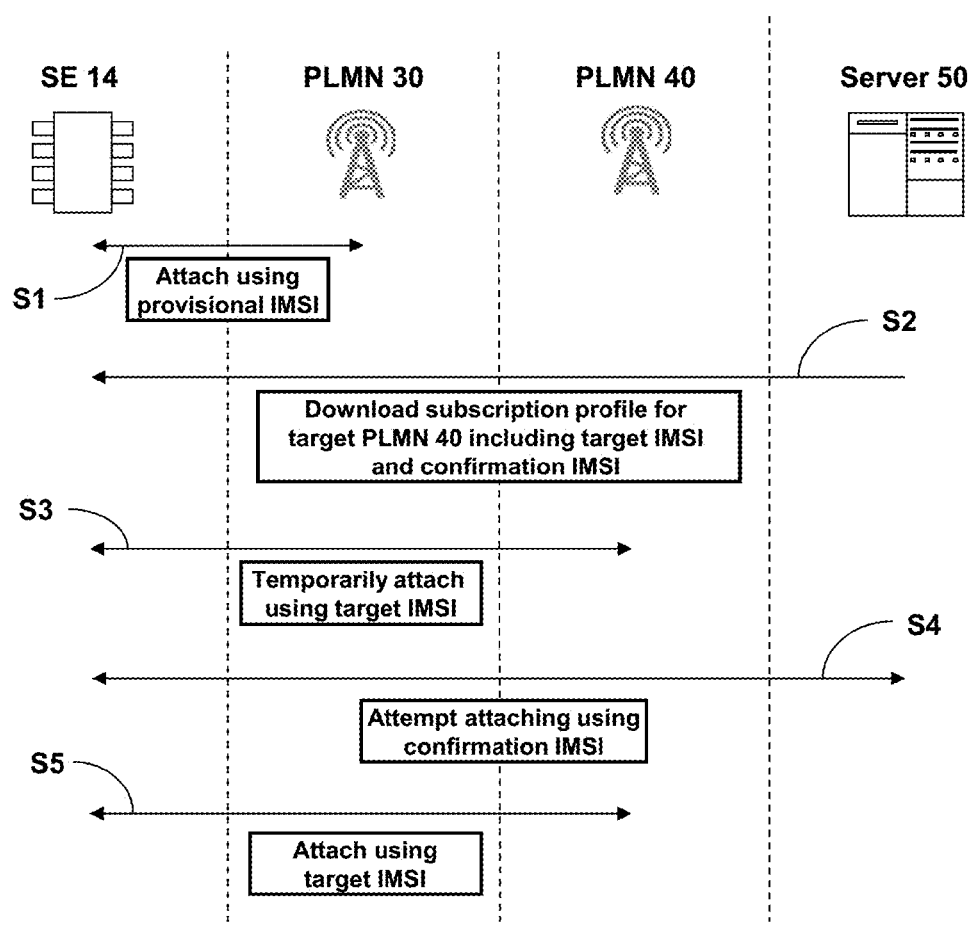
FIG. 2 shows a diagram illustrating a method for performing a mobile network switch from a first mobile network to a second mobile network of the mobile communications system of FIG. 1 according to a preferred embodiment of the invention.

In step S1 of FIG. 2 the secure element 14 authenticates itself vis-à-vis the provisioning PLMN 30 using its provisional subscription profile 18a including a provisional IMSI. In step S2 of FIG. 2 the secure element 14 downloads the target subscription profile 18b from the SM server 50 for attaching to the target PLMN 40 and utilizing the services provided thereby. Preferably, the target subscription profile 18b includes in addition to a target IMSI for attaching to the target PLMN 40 a confirmation IMSI for confirming a successful attachment to the target PLMN 40, i.e. for confirming that the switch from the provisioning PLMN 30 to the target PLMN 40 has been successful. Along with downloading the target subscription profile 18b, the SM server 50 can provide the secure element 14 with a plurality of commands, such as commands for storing the target subscription profile 18b in the non-volatile memory 17 of the secure element 14, erasing the provisional subscription profile 18a in the non-volatile memory 17 of the secure element 14 and the like.

In step S3 of FIG. 2 the secure element 14 tries to temporarily attach to the target PLMN 40 using the target IMSI provided by the SM server 50 as part of the target subscription profile 18b in step S2 of FIG. 2. Once the secure element 14 has successfully attached to the target PLMN 40, it detaches from the target PLMN 40 and initiates another attachment procedure using the confirmation IMSI (step S4 of FIG. 2), preferably provided by the SM server 50 along with the target subscription profile 18b in step S2 of FIG. 2. As already described above, this confirmation IMSI is part of a "Send Authentication Information" message according to the GSM standard that is preferably forwarded to the SM server 50. The person skilled in the art will appreciate that this step of forwarding the "Send Authentication Information" message to the SM server 50 could be handled either by the provisioning PLMN 30 or by the target PLMN 40 or, as the case may be, by another PLMN, more specifically by a respective MSC thereof.

As is well known to the person skilled in the art, according to the GSM standard the IMSI is a number with up to 15 digits that allows for an internationally unique identification of the subscriber. The first 3 digits of the IMSI represent the Mobile Country Code (MCC), the next 2 or 3 digits represent the Mobile Network Code (MNC), and the remaining digits (up to 10) represent the mobile station identification number (MSIN) generally assigned by the MNO.

The confirmation IMSI according to the present invention preferably has the same format as a "conventional" IMSI, such as the provisional IMSI for attaching to the provisioning PLMN 30 or the target IMSI for attaching to the target PLMN 40, and differs therefrom only in that some part of the confirmation IMSI indicates to the provisioning PLMN 30 or the target PLMN 40 that the "Send Authentication Information" message including the confirmation IMSI is to be forwarded to the SM server 50, i.e. encodes an "address" of the SM server 50. Consequently, it is possible that, as in the case of the IMSI, the first 3 digits of the confirmation IMSI represent the Mobile Country Code and the next 2 or 3 digits of the confirmation IMSI represent the Mobile Network Code. This would have the advantage that, for instance, the operator of a PLMN (being uniquely defined by a certain mobile country code and a certain mobile network code) could reserve a set of unassigned mobile station identification numbers (i.e. the remaining digits of the confirmation IMSI) as indicators that the secure element 14 has successfully attached to the target PLMN 40. Alternatively, the confirmation IMSI could have a unique Mobile Country Code and/or a Mobile Network Code that has not been allocated by the International Telecommunication Union yet.

According to preferred embodiments of the invention the confirmation IMSI in addition to indicating to the respective PLMN to be forwarded to the SM server 50 contains further information, such as an identification element or a transaction ID and/or information about the current state of the secure element 14. Using the identification element or transaction ID, the SM server 50 is able to identify the secure element 14. In this way, the SM server 50 obtains information about the state of the secure element 14 without having to setup a dedicated communication channel. An exemplary confirmation IMSI according to the present invention could have the following format: "123456701012310", wherein the first 6 digits correspond to the MCC and the MNC, the next two digits encode the service requested from the SM server 50, the next four digits are the transaction ID and the last two digits encode the state of the secure element 14, such as "attachment to target PLMN 40 successful", "attachment to target PLMN 40 not successful" and the like. The person skilled in the art will appreciate that depending on the number of services provided by the SM server 50 or the possible states of the secure element 14 a different number of digits could be used to encode the same.

Having received the "Send Authentication Information" message including the confirmation IMSI in step S4 of FIG. 2, the SM server 50 preferably replies thereto with a response in a conventional format, wherein the challenge data, i.e. in case of a conventional GSM response one or more authentication triplets, preferably encodes instructions for the secure element 14, such as instructions that cause the secure element 14 to enter the normal mode using the target subscription profile 18b and to attach to the target PLMN 40, as shown in step S5 of FIG. 2 (in case the switch to the target PLMN 40 was successful), or to return to the provisional subscription profile 18a and to retry the switching procedure (in case the switch to the target PLMN 40 was not successful).

In light of the above detailed description the person skilled in the art will appreciate that modifications and/or additions can be made to the methods, devices and systems as described heretofore, which are to be considered to remain within the scope of the present invention as defined by the appended claims. For instance, the person skilled in the art will appreciate that in order for the provisioning PLMN 30, the target PLMN 40 and/or, as the case may be, another PLMN to be able to forward the attachment request including the confirmation IMSI to the SM server 50 it might be necessary that the SM server 50 informs these PLMNs beforehand about the confirmation IMSI provided to the secure element 14. Preferably, this can be done concurrently with or after the download of the target subscription profile 18b in step S2 of FIG. 2.

The invention claimed is:

1. A method for performing a switch from a first mobile network to a second mobile network by a mobile terminal comprising a secure element, wherein the method comprises the following steps:
    (a) requesting attachment to the first mobile network using a first identification data element of a first subscription profile;
    (b) downloading from a subscription management server a second identification data element and a confirmation data element, wherein the confirmation data element defines an address of the subscription management server;
    (c) requesting attachment to the second mobile network using the second identification data element of a second subscription profile;
    (d) once the secure element has successfully attached to the second mobile network using the second identification data element of the second subscription profile, detaching from the second mobile network; and
    (e) requesting attachment to the first mobile network, the second mobile network or another mobile network by sending a message including the confirmation data element to the subscription management server using the address defined in the confirmation data element, wherein the confirmation data element has the same format as the first and the second identification data element and is configured such that the attachment request is forwarded to a subscription management server in order to inform the subscription management server whether the attachment to the second mobile network was successful.

2. The method of claim 1, wherein the method comprises the following additional step after step (e):
    (f) requesting attachment to the second mobile network using the second identification data element of the second subscription profile.

3. The method of claim 1, wherein the method includes the additional step of informing the first mobile network, the second mobile network or a different mobile network about the confirmation data element in order for the respective mobile network to be able to forward the attachment request to the subscription management server.

4. The method of claim 1, wherein in addition to encoding an address of the subscription management server the confirmation data element contains information about the state of the secure element and/or a unique identifier that allows the subscription management server to identify the secure element.

5. The method of claim 1, wherein step (e) includes the additional step of receiving commands from the subscription management server to be executed by the secure element.

6. The method of claim 5, wherein the commands are encoded in the standard reply to the attachment request.

7. The method of claim 1, wherein the first mobile network and/or the second mobile network are operated according to the GSM standard, 3GPP, 3G, or LTE.

8. The method of claim 1, wherein the attachment request message is a "Send Authentication Information" message.

9. The method of claim 1, wherein the first subscription profile is a provisional subscription profile that is stored on the secure element during the manufacturing and/or personalization process of the mobile terminal and/or the secure element.

10. The method of claim 1, wherein the first subscription profile and the first identification data element are cloned.

* * * * *